(12) United States Patent
Tsai

(10) Patent No.: US 8,416,345 B2
(45) Date of Patent: Apr. 9, 2013

(54) HOST COMPUTER WITH TV MODULE AND SUBTITLE DISPLAYING METHOD

(75) Inventor: Teng-Yu Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 23 days.

(21) Appl. No.: 13/213,312

(22) Filed: Aug. 19, 2011

(65) Prior Publication Data

US 2012/0188443 A1    Jul. 26, 2012

(30) Foreign Application Priority Data

Jan. 25, 2011    (TW) .............................. 100102738 A

(51) Int. Cl.
*H04N 5/445*    (2011.01)
(52) U.S. Cl. ...................................................... 348/468
(58) Field of Classification Search .................. 348/468, 348/467, 465, 460, 473, 725, 552, 563, 564, 348/565, 566, 567, 569; 386/245; 725/53, 725/52, 43
See application file for complete search history.

(56) References Cited

U.S. PATENT DOCUMENTS

| | | | | |
|---|---|---|---|---|
| 4,706,121 | A * | 11/1987 | Young | 348/27 |
| 5,973,722 | A * | 10/1999 | Wakai et al. | 725/76 |
| 7,590,331 | B2 * | 9/2009 | Horii et al. | 386/248 |
| 7,925,138 | B2 * | 4/2011 | Ando et al. | 386/240 |
| 8,255,555 | B2 * | 8/2012 | Takemura et al. | 709/231 |
| 2005/0289600 | A1 * | 12/2005 | Kawahara et al. | 725/53 |
| 2008/0085099 | A1 * | 4/2008 | Guihot | 386/95 |
| 2010/0034516 | A1 * | 2/2010 | Tanaka et al. | 386/95 |

* cited by examiner

*Primary Examiner* — Paulos M Natnael
(74) *Attorney, Agent, or Firm* — Altis Law Group, Inc.

(57) ABSTRACT

A host computer includes a display and a TV module. The TV module includes an obtaining module, a network module, and a subtitle displaying module. The obtaining module obtains a TV program and details relevant to it by means of the TV module. The network module finds subtitle data via a network according to the program name and a selected language. The subtitle displaying module displays the subtitles synchronously with the TV program.

9 Claims, 5 Drawing Sheets

HOST COMPUTER WITH TV MODULE AND SUBTITLE DISPLAYING METHOD

BACKGROUND

1. Technical Field

The present disclosure relates to computers, and particularly to, a host computer with a TV module and a subtitle displaying method.

2. Description of Related Art

People can see the news or films on television and there are subtitles corresponding to the news or the films. It is inconvenient and difficult for people who are unfamiliar with subtitles in the language of the program and they require subtitles in his or her own language.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
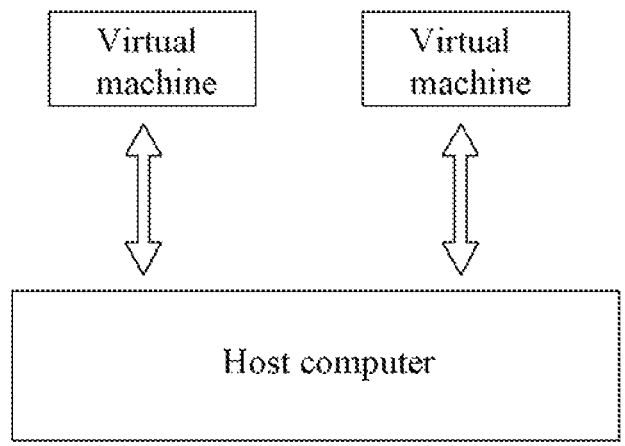
FIG. 1 is a block diagram of an embodiment of the host computer.

Referring to FIG. 1, a virtual environment includes a host computer and a plurality of virtual machines working on the host computer. The host computer has a host operating system and each virtual machine has a guest operating system. Users can do different things by means of the different virtual machines. For example, one virtual machine may be used for displaying a TV program, and another virtual machine may be used for displaying subtitles corresponding to the TV program.

Figure 2:
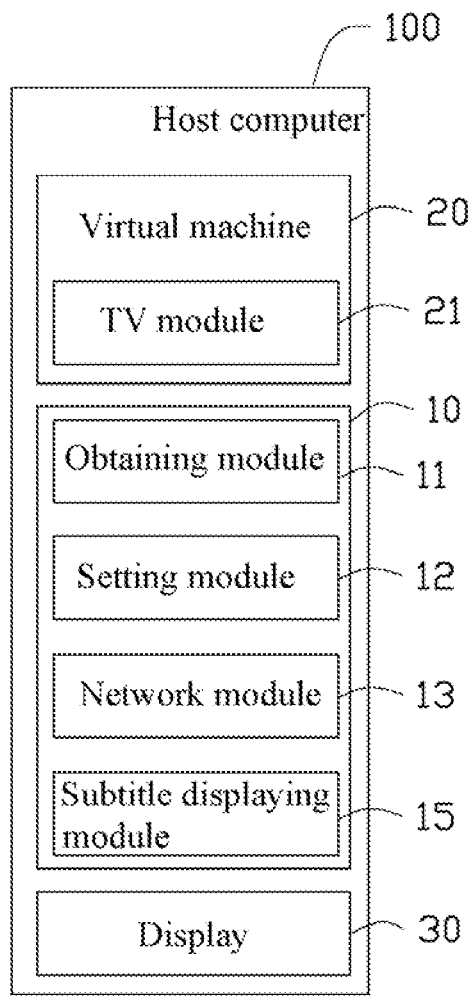
FIG. 2 is a block diagram of an embodiment of the host computer.
Figure 3:
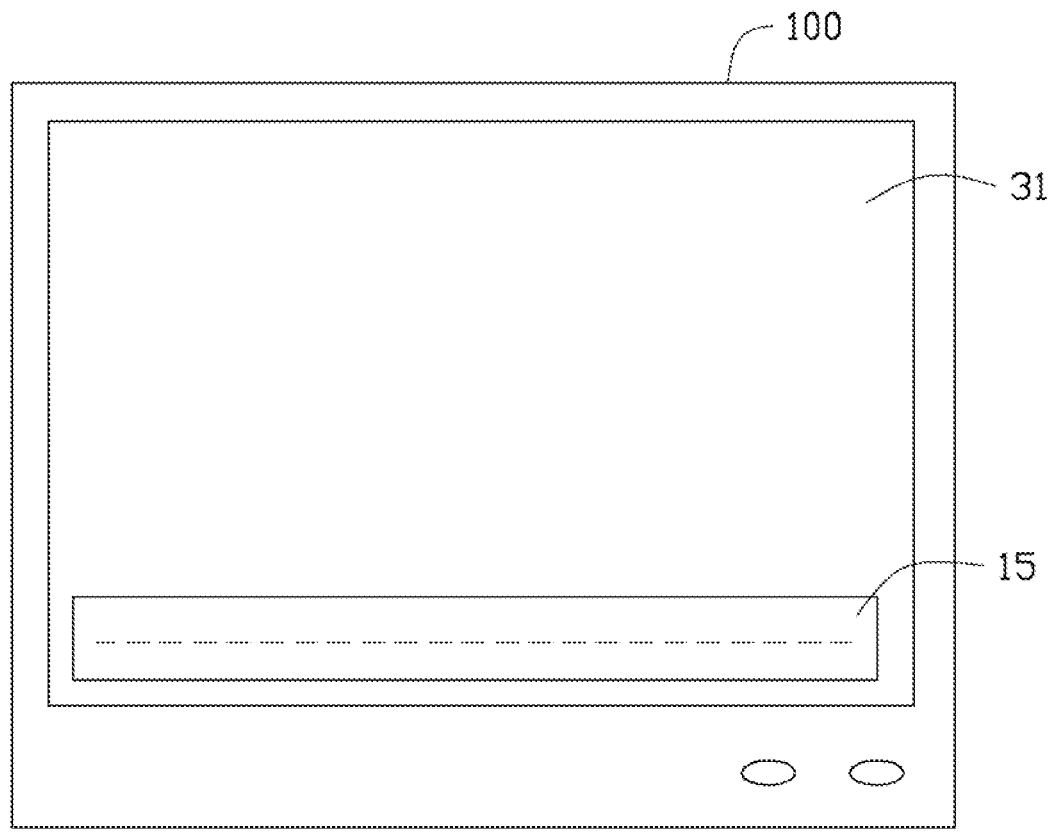
FIG. 3 is a schematic view of an embodiment of the host computer.

Referring to FIGS. 2 and 3, a host computer 100 includes a television (TV) module 21, a control module 10, and a display 30. The control module 10 includes an obtaining module 11, a setting module 12, a network module 13, and a subtitle displaying module 14, and a display window 15. A virtual machine 20 works on the host computer 100. The TV module 21 is included in the virtual machine 20. The obtaining module 11 obtains the program name of the current TV program of the TV module 21 by analyzing the channel data of the TV module 21. The setting module 12 is used for setting a particular language. The network module 13 is used for finding subtitle data corresponding to the current TV program via a network according to the program name of the current TV program and the language of the setting module 12. The subtitle displaying module 14 is used for displaying subtitles in the display window 15.

Figure 4:
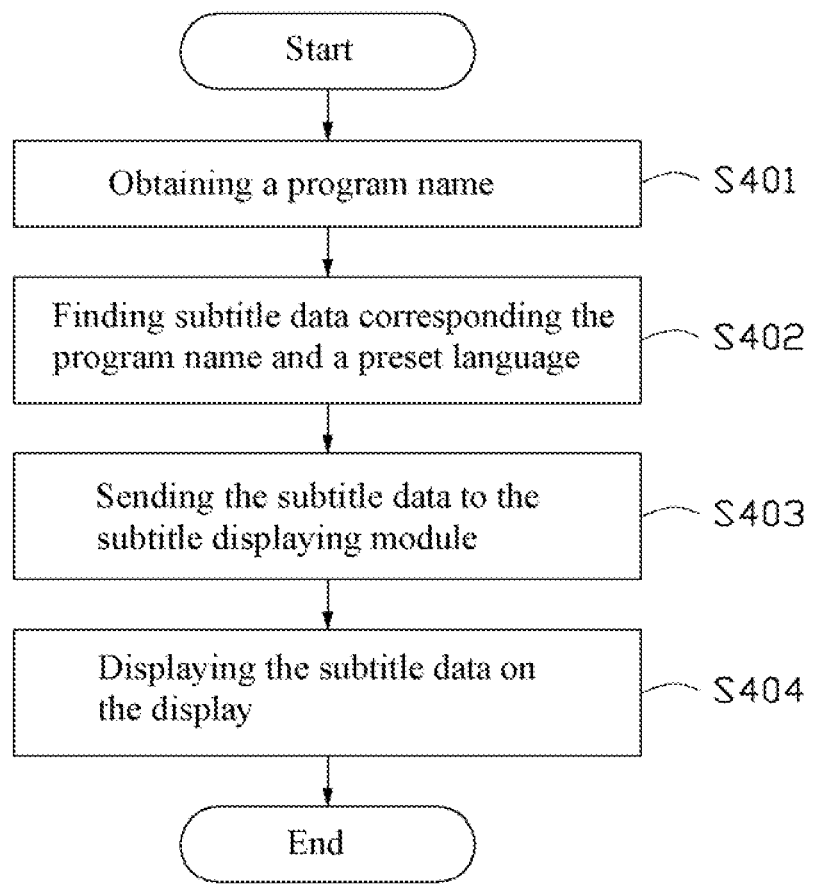
FIG. 4 is a flowchart in accordance with an embodiment of a subtitle displaying method.

Referring to FIG. 4, a subtitle-displaying method is shown. An embodiment of the method is as follows.

In step S401, the obtaining module 11 obtains the program name of the current TV program from the TV module 21. During the process, the obtaining module 11 analyzes the program menu to obtain the program name or receives a program name which may be input by a user.

In step S402, the network module 13 finds subtitle data corresponding to the program name via a network according to the program name and the language set by the user. In one embodiment, the network module 13 finds subtitle data from a professional website, such as a shooter website.

In step S403, the network module 13 sends the subtitle data to the subtitle displaying module 14. During the process, if the subtitle data is not a default form, the network module 13 converts it to be a default form.

In step S404, the subtitle displaying module 14 displays the subtitles on the display window 15.

Figure 5:
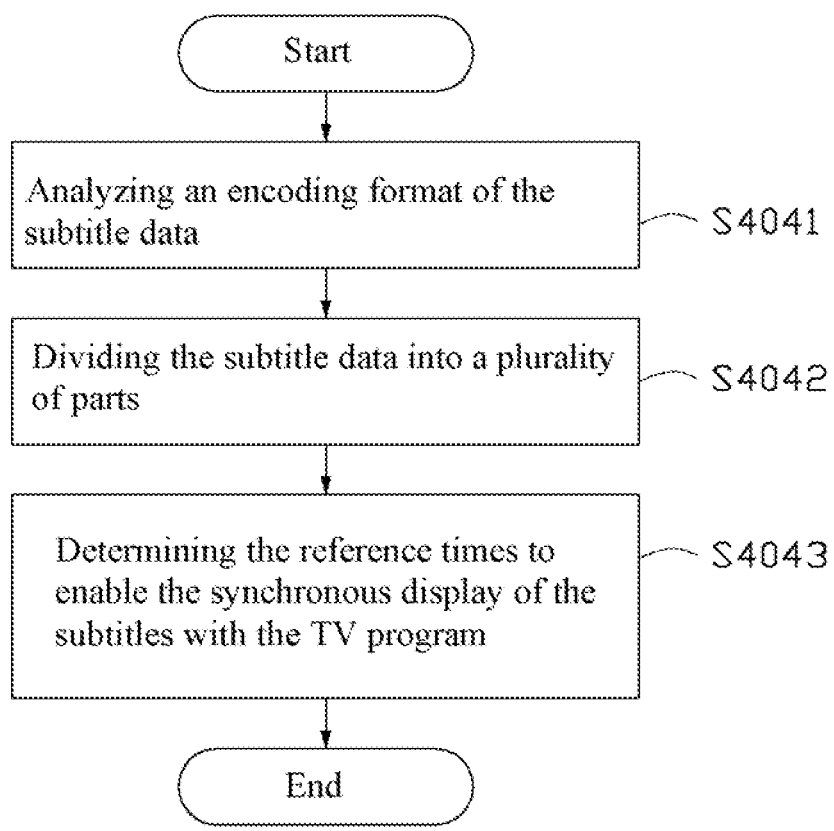
FIG. 5 is a flowchart in accordance with a process of step 401 in FIG. 4.

Referring to FIG. 5, the process of step S404 is shown. An embodiment of the process is as follows.

In step S4041, the subtitle displaying module 14 analyzes the current encoding format of the subtitle data. If the current encoding format is different from a predetermined encoding format, the subtitle displaying module 14 converts the current encoding format to a predetermined encoding format.

In step S4042, the subtitle displaying module 14 divides the subtitle data into a plurality of parts according to a time stamp.

In step S4043, the subtitle displaying module 14 determines the reference times to enable the synchronous display of the subtitles with the TV program.

In the above method, through the browser module 32, the network module 13 finds a corresponding website when users switch to a new channel.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and the arrangement of parts within the principles of the present disclosure to the full extent indicated by the broad general meaning of the terms in which the appended claims are expressed.

Depending on the embodiment, certain of the steps of a method(s) described may be removed, others may be added, and the sequence of steps may be altered. The description and the claims drawn for a method may include some indication in reference to certain steps. However, the indication used is only to be viewed for identification purposes and not as a suggestion as to an order for the steps.

What is claimed is:

1. A host computer, comprising:
a display; and a TV module, the TV module comprising:
   an obtaining module, the obtaining module adapted to obtain a TV program name of a current TV program;
   a network module, the network module adapted to obtain subtitle data via a network according to the TV program name and a selected language; and
   a subtitle displaying module, the subtitle displaying module adapted to display the subtitle on the display synchronously with the current TV program;
   wherein the subtitle displaying module is adapted to analyze a current encoding format of subtitle data and convert the current encoding format to a predetermined encoding format when the current encoding format is different from the predetermined encoding format.

2. The host computer of claim 1, wherein the obtaining module is adapted to obtain the TV program name by analyzing a program menu of the TV module.

3. The host computer of claim 1, wherein the obtaining module is adapted to obtain the TV program name inputted by a user.

4. The host computer of claim 1, wherein the subtitle displaying module is adapted to display the subtitle data corresponding to the current TV program.

5. The host computer of claim 4, wherein the subtitle displaying module is adapted to divide the subtitle data into a plurality of parts, determine a reference time to enable each part to correspond to the current TV program, and display each part to enable the subtitle data corresponding to the current TV program.

6. A subtitle displaying method comprising:
   providing a host computer, the host computer comprising a display, a TV module and a control module;
   obtaining a program name of a current TV program of the TV module by the control module;
   finding subtitle data via network according to the program name and a selected language by the control module; and
   displaying the subtitle data on the display by the control module;
   wherein the displaying the subtitle data comprises: dividing the subtitle data into a plurality of parts according to a time stamp, determining a reference time to enable each part to correspond to the current TV program, and displaying each part on the display.

7. The subtitle displaying method of claim 6, wherein the obtaining the program name comprises analyzing a program menu of the TV module to obtain the program name.

8. The subtitle displaying method of claim 7, wherein the program name is inputted by a user.

9. A host computer, comprising:
   a display; and
   a TV module, the TV module comprising:
      an obtaining module, the obtaining module adapted to obtain a TV program name of a current TV program;
      a network module, the network module adapted to obtain subtitle data via a network according to the TV program name and a selected language; and
      a subtitle displaying module, the subtitle displaying module adapted to divide the subtitle data into a plurality of parts, determine a reference time to enable each part to correspond to the current TV program, and display each part to enable the subtitle data corresponding to the current TV program.

\* \* \* \* \*